Patented Oct. 13, 1953

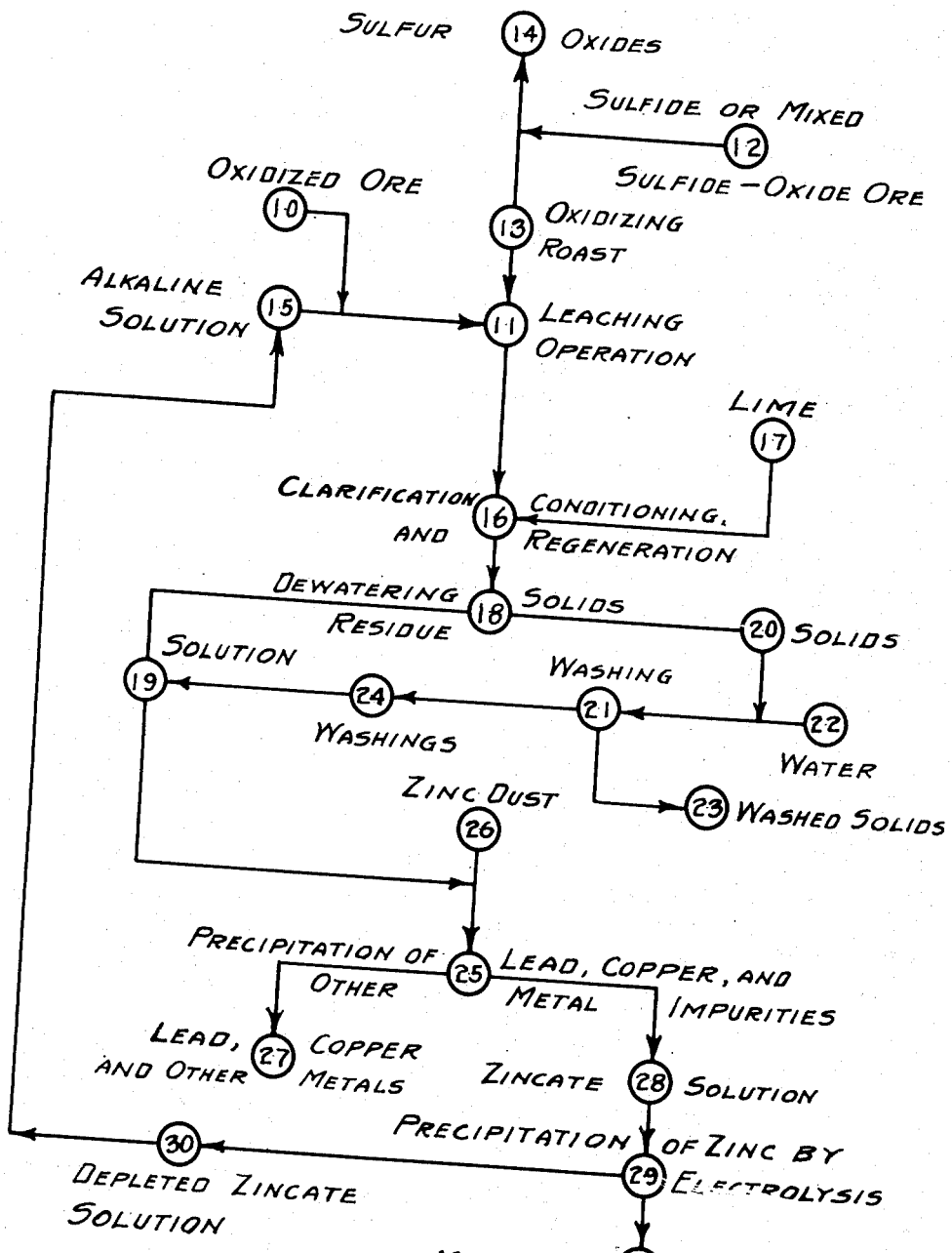

2,655,472

UNITED STATES PATENT OFFICE 2,655,472

PROCESS OF EXTRACTING AND RECOVERING METALS BY LEACHING AND ELECTROLYSIS

Robert V. Hilliard and Charles T. Baroch, Boulder City, Nev.

Application December 16, 1949, Serial No. 133,452

8 Claims. (Cl. 204—116)

(Granted under Title 35, U. S. Code (1952), sec. 266)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to a process of treating oxidized ores or metallurgical residues containing various metals, by leaching with an alkaline solution to dissolve the metals, clarifying the leach solution and separating it from the non-metallic residue, and precipitating the metals from the solution electrolytically, or, where several metals are involved, by a combination of replacement and electrolytic decomposition. The process is most generally amenable to the oxidized ores or products containing lead, zinc, and copper; however, other metals are known to come under its purview.

Many types of ore, especially of lead, zinc, and copper, throughout the world are not being exploited because no economically feasible process for their treatment is known. These ores are generally and broadly referred to as oxidized or mixed oxide-sulfide base-metal ores. They are usually of low tenor or so situated that smelting or pyrometallurgical methods of treatment are costly, and most of the ores referred to are not generally amenable to beneficiation or concentration by any known means. Frequently the ores are complex associations of the minerals of several metals also often intermingled so intimately with gangue minerals that the physical separation of the metallic minerals from each other and the gangue is almost impossible.

An object of the present invention is to provide a process whereby certain metals are dissolved from an ore by an alkaline reagent solution and thereby separated from other constituents of the ore.

Another object of the present invention is to provide a process for recovering the metals from the alkaline reagent solution. If the ore contains substantially a single metal amenable to the process, that metal may be recovered electrolytically in a pure form, directly usable in the arts and industry. If the ore contains substantial quantities of two or more metals amenable to the process, the more noble of the metals may be recovered in comparatively pure and valuable form, by chemical substitution or replacement, following the regular laws and order of the electromotive series, and the most base metal may be recovered electrolytically as a pure, commercial product.

Still another object of the present invention is to provide a process whereby the alkaline reagent solution can be regenerated substantially to its original constitution and thereby remain useful for recycling through the process to leach additional quantities of ore.

Still another object of the present invention is to provide a process whereby amenable metals can be removed from certain ores and recovered in commercial products and, at the same time, leave the residual materials from leaching in a suitable form for ready extractions of other metals. For instance, lead, zinc, copper, when present singly or in combination in an ore, can be removed from the ore and leave a residue from which any gold or silver can be recovered by flotation, cyanidation, or other known processes.

A further object of the present invention is to provide a process for separating various metals one from another or in groups which are further refinable by simple and well-known methods, as for instance, the separation and recovery of zinc from lead and copper.

These objects and advantages are accomplished by the method for the recovery and separation of metals which comprises the steps of leaching an oxidized ore with an alkaline solution; clarifying, conditioning, and regenerating the pregnant leach solution by treating said leach solution with lime; removing the insoluble residue from the thus treated solution; independently precipitating the various noble metal constituents by successive replacement reactions with less noble metals; independently separating the thus precipitated metals; electrowinning the basic metallic constituents contained in the residual solution; and recycling through the leach step the barren solution from the electrowinning treatment.

This description is given in connection with the accompanying drawing, wherein the single figure is a diagrammatic illustration of a system for carrying out the treatment according to the present invention.

Referring to the drawing, most thoroughly oxidized ores 10, are amenable to treatment by the process without preliminary treatment, other than crushing or grinding to the proper degree of fineness. The term "oxidized ores" is meant to include all minerals classified mineralogically as belonging to oxidized or secondary species as differentiated from sulfide or primary minerals, and the term includes true oxides, hydrous-oxides, carbonates, sulfates, chlorides, hydrous silicates, and similar compounds.

Sulfide minerals are not soluble in the leaching solution, with a few exceptions, such as arsenic, mercury, and antimony sulfides. To obtain satisfactory extractions, sulfide or partially sulfide minerals 12 require pretreatment by an oxidizing roast 13 conducted by various well-known means to drive off the sulfur as gaseous oxides 14.

Many artificial products may be amenable to this process, such as smelter dusts, drosses, slags, and related materials. Similarly, material for this process may be residues from other metallurgical operations, such as concentrator tailings. Some of these feed materials may require special preparation before leaching. The material must be crushed or ground to a fineness consistent with good leaching practice, taking into consideration the physical and chemical nature of the material and the method of leaching. Ordinarily, the feed material will need to be ground to pass a ⅛-inch screen or finer, and in some cases grinding may have to be carried as fine as minus 100-mesh to obtain good extractions.

The prepared ore or other material is charged by suitable means to the leaching operation 11, where the solids are brought intimately in contact with the alkaline solution 15. The method of leaching is not relevant to the present invention, and any of the conventional methods may be employed, such as various agitation methods, percolations, or heap leaching, whichever is most suitable or economical for a specific ore or product. With the exception of heap leaching, most leaching operations are conducted in tanks, which may be made of concrete, wood lined with alkali-resistant paint or compounds, or steel and other metals which are resistant to the alkaline solution. Leaching is most effective when the solids and the solution are intimately in contact with each other and when the solid particles and the solution are mixed or moved with relation to each other. In agitators, the solids and solution form a slurry kept in motion more or less violently by propellers, paddles, or other mechanical devices. In percolation and heap leaching, the solution is moved by pumps and allowed to flow through or percolate through a bed of stationary solids. The leaching may be conducted in batches or in a continuous operation.

The alkaline solution 15 may be made up of a large variety of readily soluble alkali compounds, together with other accessory salts or compounds, dissolved in water. The strong caustic alkalies such as caustic soda, NaOH, the caustic potash, KOH, appear to be the most universally satisfactory solvents for the dissolution of the largest number of metallic minerals, although solutions containing mild alkalies such as sodium carbonate, $Na_2CO_3$, potassium carbonate, $K_2CO_3$, and ammonium carbonate $(NH_4)_2CO_3$, are effective in some cases. In still other cases a solution of a mixture of the strong caustic and mild alkalies is most satisfactory.

The strength of the alkali solution used for leaching may be varied within wide limits, but some minerals require stronger solutions than others. For instance, certain zinc minerals like smithsonite and hydrozincite are readily soluble in solutions containing about 5 percent strong caustic alkali, whereas zinc silicate minerals, like hemimorphite and willemite may require solutions containing as much as 25 percent of the same alkalies to be readily soluble under the same leaching conditions.

Similarly the temperature and leaching time will vary with the class of material being treated. Generally, an increase in temperature is beneficial and will permit good extractions in shorter leaching periods, and the application of heat to expedite leaching, balanced against leaching time, becomes largely an economic consideration. Leaching time on the more refractory materials has varied from 4 to 18 hours at temperatures varying from 50 degrees to 80 degrees centigrade. Less refractory minerals have been leached successfully in 2 hours at atmospheric temperatures (25° C.). Heating, when necessary, may be performed in any standard manner consistent with the type of leaching method. Agitation leaches are heated effectively by steam coils submerged in the leach pulp, by submerged burners, or electrically with heating elements. Stationary bed percolation leaches usually require the application of heat to the solution outside the leaching tank, that is, hot solutions are applied to the ore bed. Such solutions may be heated in boilers, hot-water heaters, or heat exchangers.

The chemical reactions involved in the dissolution of minerals are not known with scientific exactness, however, they are apparently closely related to the reactions of many amphoteric elements with basic compounds. Lead and zinc, forming compounds known as plumbites and zincates, respectively, are typical examples of the reactions involved.

Accessory salts or compounds may be added to the alkaline solution for the purpose of assisting in the extraction of some metals otherwise insoluble. For instance, alkali cyanide salts may be added for the purpose of extracting gold and silver, and certain oxidizing compounds, such as sodium hypochlorite, NaOCl, may be useful for oxidizing some metallic minerals. Other neutral salts, such as sodium chloride, NaCl, may be added for the purpose of increasing the electrical conductivity of the solution as well as for increasing the solubility of minerals.

The leaching operation 11 produces a pulp when fine ores or materials are leached, but a solution that can be drained away from a percolation or heap leach.

After operation 11, the pulp or solution proceeds by suitable mechanical arrangement to an operation herein designated as clarification, conditioning, and regeneration 16. The principal reagent 17 used in this operation is lime, CaO, or hydrated lime, $Ca(OH)_2$. The lime has a beneficial influence in clarifying and purifying the solution, an action that may be both chemical and physical. The chemical part of the action may be due to reactions that are known to occur as, for instance, the interaction of lime with the carbonate radicals, according to the ionic equations:

$$CO_3^{--} + Ca(OH)_2 \rightarrow CaCO_3 + 2OH^-$$

Other benefits of the lime addition are more obscure. For instance, it is known that the lime removes what appears to be dissolved silica from the alkaline pregnant leach solution. This may be a chemical decomposition of sodium silicate formed during leaching from silica in the ore, or it may be a physical flocculation or agglomeration of colloidal silica in the solution. Dissolved silica, at least to a certain point, is not inimical to the process, but on continued recycling of solutions in a long-operated process, it is desirable to have a means of controlling the silica content, which is performed by the lime treatment.

The lime-treatment step has been shown on the flow sheet of the figure as taking place directly after the leaching operation 11, because at this point all solids-liquid separation procedure can be done in one operation 18, next to be described. Alternately, however, the lime-treatment clarification, conditioning, and regeneration procedure can be employed at any other stage of the flow sheet as the solution progresses through the process. Other points of application, suitable under certain conditions, are: (a) on the combined liquids beyond step 19; (b) prior to electrolysis beyond step 25 and ahead of step 29; and on depleted solution 30 after electrolysis. Also, alternatively, the lime-treatment operation may be performed as an integral part of, or a supplementary operation to the leaching operation 11, in which case the lime might be added with the ore during leaching or at a certain stage of the leaching operation.

Further, the clarification, conditioning, and regeneration may not need to be performed continuously or on each cycle of the leach solution. It may be necessary only after the solution has passed through the complete process cycle a considerable number of times. The necessity for lime treatment is evidenced by an appreciable lessening of the extractive ability of the solution in the leaching operation, or by a physical fouling of the solution with colloidal or extremely fine solid material, which is difficult to remove by settling, filtering or other clarification procedures.

The lime may be added as a well-burnt limestone, CaO, in which case it should be finely ground to be most effective but, preferably, it may be added as slaked lime, calcium hydroxide, $Ca(OH)_2$, mixed with a small amount of water in the form known in the arts as milk of lime. The reaction is most effective at temperatures above 80 degrees centigrade and, during the reaction, the slurry should be agitated. Normally, the reaction should be complete in about one hour at a temperature of 85 degrees centigrade, and is accelerated by high temperatures.

The amount of lime necessary is a slight excess of the stoichiometric quantity required to remove the desired amount of $CO_3^{--}$ ions, as given in the equation above. It is very difficult to remove all of these acid radical constituents and, practically, it is not necessary to do so. The tolerance for the amount of carbonate in the alkaline solution varies greatly with the type of mineral being leached. For instance, in leaching and oxidized lead-zinc-copper ore, it was found that satisfactory results were obtained with a solution containing 190 grams $Na_2O$ per liter, of which 57.0 grams $Na_2O$ per liter was present as $Na_2CO_3$ or about 40 grams $CO_2$ per liter, and the balance was NaOH. Lime treatment will readily bring such a solution down to around 20 grams $CO_2$ per liter.

Sulfate and carbonate ions enter into the solution by the leaching and dissolution of sulfate and carbonate minerals. Carbonate is also extracted from the air by interaction of the $CO_2$ in the air with the caustic alkali in the solution.

Pulp or slurry from the lime treatment 16 or the leaching operation 11, as the case may be, proceeds to a dewatering operation 18, where the solids residue 20 of the pulp is separated from the metal-bearing, or pregnant, solution 19. This operation may be performed by any of a large number of hydrometallurgical techniques, including filtering, settling, decantation, thickening, centrifuging, or counter-current decantation, or other means or combination of methods.

The solids 20 proceed to a washing operation 21 where entrained alkaline solution and metal values are diluted with water 22 and again separated from the solids 23. The degrees of washing should be in accordance with well-known chemical principles of such practice, balancing the economic value of recovered solute against the cost of discarding or evaporating excess water from the process circuit. Considerable evaporation will take place throughout the process naturally, but if an excessive amount of wash water is used, an evaporator (not shown) may be necessary at some point in the circuit.

Typically, an excellent system of dewatering and washing would be a series of counter-current decantation thickeners in step 18 and mechanical pressure or vacuum filtration of the thickened solids pulp in step 21, in which the filter cake would be washed by displacing the alkaline solution with water 22.

Alternately, all the operations shown in the figure from the leaching operation 11 through all the operations numbered consecutively to the washed solids 23 may be carried on concommittantly in one continuous operation. Typically, such a process could consist of several stages of agitation leaching tanks in which conditioning and regeneration 16 could take place in the last leaching stage, followed by a series of counter-current decantation thickeners, in which the thickened leach pulp passes in one direction successively through the series of thickeners and is diluted in the last thickener with wash water. The overflow or decanted solutions proceed counter-currently back toward the first thickener successively, each time mixing with and diluting the opposite-moving thickened pulp.

The washed solids 23 may be discarded, when valueless, or they may enter another process for recovery of valuable constituents.

The metal-bearing alkaline solution 19 combined with washing liquors 24 proceeds to the first step of the metal-recovery process, indicated on the flow diagram as "Precipitation of Lead, Copper, and other Metal Impurities 25."

Before the zinc can be recovered in a commercially pure condition from the solution by electrolysis, all the metals electropositive or more noble to zinc must be eliminated from the solution. Otherwise such metals would tend to co-deposit with the zinc at the cathode, contaminate the resultant zinc metal, making it less useful in the arts. The most valuable commercial metals found associated with zinc in ores and metallurgical products, and which are readily soluble in the alkaline solution, are lead and copper, but tin, bismuth, antimony, and arsenic also occur in lesser or trace amounts. These metals are often classed as the "hydrogen sulfide group" of metals and, for brevity, they will be so referred to herein. If an alkali cyanide is added to the leach solution the noble metals gold and silver may also be dissolved in the solution, and if such is the case, any future mention of the hydrogen sulfide group of metals may be deemed to include them, as these precious metals will also obey the same laws of precipitation by replacement. This feature of leaching base metals with one lixiviant reagent while concurrently extracting precious metals by cyanidation has not been practiced in the art heretofore. In addition to contaminating the zinc, any such metals codepositing with the zinc during electrolysis will induce reactions between the metal deposit and the electrolyte which result in re-solution of the metal deposit, thereby greatly lowering the efficiency of deposition or even causing deposition to cease. This action may be the result of electrocouples formed between two dissimilar metals in an electrolyte, or it may be caused by lowering of the hydrogen overvoltage at the cathode, the phenomenon upon which the electrodeposition of zinc from an aqueous electrolyte is conceded to depend. When the electrolyte contains even minute quantities of these metals with the zinc, electric energy is largely wasted in producing hydrogen gas instead of depositing metal. Therefore, the complete removal of all such metals from the solution is essential for successful and efficient electrolysis.

The removal of the hydrogen sulfide group of metals from the alkaline solution is done with zinc dust 26. The purification occurs by chemical replacement or substitution whereby zinc replaces the other metals which are thereby precipitated as a spongy, finely divided precipitate. While the chemical reaction is simple, ordinarily a complete removal of the hydrogen sulfide group of metals is incomplete except when a very large excess of zinc dust is used, unless certain conditions are maintained. Heretofore, complete removal of these metals has required uneconomic quantities of zinc dust, possibly several times the stoichiometric quantity, to produce an electrolyte sufficiently pure to produce good quality zinc metal.

Our discovery has delineated a procedure that ensures virtually complete removal of the unwanted metals from the alkaline zinc electrolyte and is an improvement over previous attempts because it requires only a slight excess of zinc dust over the quantity theoretically necessary. Besides enabling the production of high-purity zinc, this procedure also produces a precipitate of the hydrogen sulfide group metals containing lesser amounts of zinc. This is a great advantage, as the smelting of metals like lead and copper is seriously complicated by the presence of large amounts of zinc.

The essentials of our discovery require attention to four elements in this step of metal precipitation and solution purification, as follows:

(a) The zinc dust used for the purification should be of the best purity obtainable, and it should be in a form that presents a large surface area per unit weight. Very finely divided, pure zinc dust is suitable, but we prefer to use the type of zinc dust produced electrolytically at a high current density by this same process. This type of zinc dust, called herein electrolytic flake zinc is very different physically from zinc dust produced by the usual methods of atomization of molten zinc or condensation of zinc vapor. Under a microscope, electrolytic flake zinc appears as very thin, flat, pinnate-shaped flakes with serrated edges, while the atomized or condensed zinc dust is in spheres or spheroidal particles. It can be shown readily that thin flakes represent a greater surface area than an equal weight of spheroidal particles of the same mesh sizing. Further, the crystalline nature of flake zinc appears to give it a higher reactivity than the other types of zinc dust. One purpose of having a large surface area is to ensure rapidity of the replacement reaction. Reaction between the alkaline solution and the zinc dust, obviously, can occur only at the surface of the solid zinc phase. Rapidity of reaction is an important economic feature and, as will be shown later, is also a requisite of complete purification of the zinc electrolyte. Another advantage of electrolytic flake zinc is that the flakes, being thin, are less subject to the entrapment of zinc caused by the surface being coated and inactivated by a coating of the precipitating metals, such as is known to occur in dip or immersion plating of metals.

(b) Time of contact between the zinc dust and the alkaline solution is important to ensure complete removal of the hydrogen sulfide group metals with a minimum of zinc dust. All the metals involved, including the zinc dust, are slowly soluble in the alkaline solution, a condition that is accelerated by the fineness of the metal particles. We have discovered that if the spongy deposited metal is precipitated quickly and removed from the solution as soon as possible after the unwanted metals have been precipitated, a solution free of all but chemical traces of the unwanted metals will be obtained with only a slight excess over the theoretical or stoichiometric quantity, of zinc dust.

(c) The temperature, at which precipitation of the other metals by zinc dust is performed, is very important. The proper temperature range is influenced by two factors: (1) The replacement reaction between zinc and the other metals is accelerated by elevated temperatures, and (2) the solubility of all the metals increases rapidly with elevated temperature. If the temperature is too low, then not only will the treatment time be excessive, but it becomes increasingly difficult to remove the unwanted metals to the degree desirable or necessary. On the other hand, a temperature too high will consume an excessive amount of zinc dust; for example, at temperatures near the boiling point, a caustic solution will react energetically with the purest of zinc dust, releasing hydrogen gas. Little replacement will occur and any of the metals precipitated will also redissolve rapidly. Our invention has discovered that by selecting a medial temperature, the precipitation of the hydrogen sulfide group of metals can be accomplished virtually completely with only a slight excess of zinc dust over the stoichiometric quantity. The optimum temperature, we have found, is in the range from 35 degrees to 50 degeers centigrade, with fair results accomplishable at an upper limit of about 65 degrees centirgade and a lower limit of about 20 degrees centigrade.

(d) The method of admixing the zinc dust with the alkaline solution has been found to be very important also. Our invention discloses that if the required zinc dust is added in small additions spread over a period of time, a purer solution and a better efficiency of zinc-dust usage is obtained than if the same amount of zinc dust was added at once and the reaction prosecuted for the same length of time. One explanation of this phenomenon is as follows: When the hydrogen sulfide group of metals are being precipitated with zinc dust, the concentration of these metals remaining in the solution diminishes and the remaining portions become increasingly difficult to precipitate because the ions are more dilute and more distantly spaced within the solution. Now, if the required amount of zinc dust is added all at once at the beginning of precipitation, the solution while most highly concentrated in the hydrogen sulfide group of metals has the benefit of the cleanest and most active zinc surfaces to react with. Then, when precipitation nears its end, when the dilution of the unwanted metals is becoming diminishingly smaller, and when active surfaces of clean zinc are most essential, most of the zinc dust has become polluted and possibly entrapped in spongy precipitate. In the method of this patent application, by adding the zinc dust in portions of the total requirement, a paucity of reactive zinc dust surface is present while the concentration of hydrogen sulfide group metals is highest and their activity is greatest. Thus, the first portions of zinc dust have a better opportunity to be consumed completely, and when the concentration of the hydrogen sulfide group metals in solution becomes low in quantity and activity, we still have a portion or portions of fresh, clean, highly reactive zinc dust surfaces to present. In other words, by our method some highly active zinc dust is reserved for the period in the precipitation when it is most needed; the zinc dust is added more nearly in the ratio of the ionic replacement activity and at the rate at which it is consumed to displace its full stoichiometric equivalent in unwanted metals, and the end point at which the hydrogen sulfide group of metals are no longer present in solution can be judged readily and reached with a minimum of excess zinc dust.

In summary, our findings are applied in a correlated operation in step 25, as follows: A quantity of the alkaline leach solution is treated in a vessel or tank equipped with a mechanical agitator of any type which will give a vigorous movement to the entire body of liquor, yet of insufficient violence to cause air to be beaten or mingled in bubbles with the solution. Air beaten into the solution causes oxidation of both the zinc dust and the precipitated spongy metals, and these metal oxides are more soluble in the alkaline solution than the unoxidized metals, therefore, aeration would defeat the purpose of the precipitation. Also, it is preferable but not entirely essential, to perform this operation in vessels lined with rubber, ceramic, plastic, paint, or any other durable nonmetallic material, to obtain highest economy of zinc dust use. Iron, or various other metals and alloys resistant to alkaline solutions, can be used for the equipment of this step, however, zinc forms a galvanic cell with most other metals in the presence of an electrolyte such as the solution used in this process, causing the zinc to dissolve relatively rapidly displacing hydrogen from the electrolyte.

Before starting the additions of zinc dust, the solution is adjusted to or near the optimum temperature range of 40 degrees to 50 degrees centigrade, heating or cooling, as the case may be if necessary. The zinc dust can be added in measured batches with a time interval between batches or it may be added slowly but continuously by a proper type of feeding device. The time interval and relative rate of adding the zinc dust should be chosen with regard to the amount of metal to be precipitated and the fineness and reactivity of the zinc dust. Typically, using electrolytic flake zinc of a fineness that all passes a standard 100-mesh sieve, a solution containing up to about 10 grams per liter sum total of all hydrogen sulfide group of metals, can be purified ordinarily in slightly over one hour after starting the zinc dust addition. In such a case, about 50 percent of the stoichiometric amount of the zinc dust could be added at once at the start; in fifteen minutes about 25 percent could be added; and in another fifteen minutes, the balance of the stoichiometric amount could be added. Now, since a slight excess over the stoichiometric equivalent is almost always necessary, fifteen minutes after the last-mentioned addition or forty-five minutes from the start, a quick chemical test will give an indication, to one who has practiced the purification a few times, of the quantity of excess zinc dust necessary to make a final complete purification. The estimated excess is then added slowly and other quick chemical tests taken at, say 5-minute intervals, will tell the operator when purification is complete.

For solutions containing more than 10 grams per liter sum total of all hydrogen sulfide group metals, it is convenient to add sufficient zinc dust immediately at the start of the operation to bring the total concentration of these metals to around 2 to 5 grams per liter, and continue agitation for about one-half hour. Then, the balance can be added slowly or at intervals as above, finally, coming to the end point as described above. When exceptionally large quantities of the hydrogen sulfide group of metals are present, a longer time is necessary for complete purification of the zinc electrolyte, but in any case, purification should be complete within two to three hours if zinc dust of proper purity and reactivity is used.

The quick chemical test mentioned is a colorimetric chemical test based on the fact that if a soluble sulfide is added to the alkaline leach solution, dissolved zinc and other metals of the hydrogen sulfide group are precipitated as sulfides. Zinc is the only metal of the ones under consideration that forms a pure white precipitate under the conditions; the others form deeply colored sulfide precipitates that have a high tinctorial value. Thus, the operator can take a portion of the solution (filtered if necessary) varying from a drop on a porcelain spot plate to several milliliters in a glass test tube or beaker, to which he adds a drop or more of a strong solution containing a water-soluble sulfide, such as sodium, potassium, or ammonium sulfide or hydrosulfuric acid. The presence of traces, even, of the hydrogen sulfide group of metals will give a colored precipitate, while a zinc electrolyte free of these metals will show as a pure white precipitate. Lead and copper, the metals of the hydrogen sulfide group most likely to predominate in the zinc leach solution yield deep black precipitates and even minute quantities present with a voluminous zinc sulfide precipitate will show as a greyish tinge in the precipitate, and larger amounts darken it progressively. Practically any individual can soon learn to judge the approximate quantity of residual sulfide group metals present, and can discern when the precipitation of these metals is complete.

In calculating the stoichiometric requirement of zinc dust it must be borne in mind that all zinc dust contains some zinc oxide, and it is only the metallic zinc present that has value in precipitating the hydrogen sulfide group of metals. Zinc oxide present in the zinc dust does no harm, merely going into solution. Commercial specifications recognize the presence of ZnO in zinc dust or metallic-zinc powder: a typical Federal specification (TT-Z-291 of May 7, 1946) requires that metallic zinc content of zinc dust shall be above 94.0 percent. This reference is given merely to show that the presence of ZnO in zinc dust is recognized, but no implication is intended that zinc dust of this grade is necessary for this process. In fact, much lower grade zinc dust may be used, and this process could be used in many cases for making use of uncommercial grades of zinc dust as, for instance, types of metallurgical zinc dust as, for instance, types of metallurgical products known in trade as "blue powder" and which are frequently difficult to reprocess or beneficate into commercial-grade products. Needless to say, all zinc dissolved in this purification step enters the zinc electrolyte and is recoverable in the subsequent electrolytic precipitation.

The amount of excess zinc dust required cannot be predicted with extreme exactness, as this will depend largely on the carefulness of the operator in estimating and approaching the end point of purification. Careful, but not overmeticulous operation, should give the degree of purification required by using an excess amount of metallic zinc dust equivalent to about 0.1 gram per liter, or slightly under 1 pound of zinc dust per 1,000 gallons of solution, if the directions of this specification are followed. This, on 1,000 gallons of a leach solution containing 10 grams Pb per liter, for instance, which requires 26.3 pounds of zinc dust to stoichiometrically precipitate the lead, would amount to slightly over 3 percent excess or 103 percent of the stoichiometric zinc dust required. These figures are cited as an example of good practice but it is not intended that this disclosure should be limited strictly to the figure cited, because it is evident that, in the example given, an excess of zinc dust more than ten-fold that shown, could be possibly deemed to be economically practicable.

After the hydrogen sulfide group of metals have been precipitated to the proper degree of completeness, the solution should be separated as quickly as possible from the precipitated metals. Decantation or vacuum or pressure filtration or a combination may be employed. The inventors prefer pressure filtration whereby the slurry is withdrawn from the bottom of the precipitating vessel by a pump and forced through a pressure filter, because no air is mixed with the solution which can cause oxidation of the precipitated spongy metals and re-solution in the alkaline solution. The purified zincate electrolyte 28 now passes on to electrolysis, step 29, and the spongy metal precipitate can be washed while in its first filter-cake form or it may be washed more elaborately as one chooses. In any case, we find it is preferable to segregate purified zinc electrolyte from washings, returning the washings to the next batch of leach solution entering the purification step 25, thereby preventing any possible redissolved spongy metals from contaminating the zincate electrolyte. If the purification has been conducted with a minimum of zinc dust by the procedure outlined herein, the washed spongy metal, after drying, contains only slight amounts of zinc and consist predominantly of hydrogen sulfide group metals. Their further beneficiation, purification and melting can be accomplished by established procedures well known to the art.

Alternatively, especially when large amounts of hydrogen sulfide metals are present, it may be desirable to perform their precipitation in two or more stages on the countercurrent principle. In the first stage, the hydrogen sulfide group of metals could be precipitated to a low concentration remaining in the solution; the precipitate in this stage could be removed by filtration and would be substantially free of zinc. The solution would proceed to a second stage where the residual hydrogen sulfide group of metals could be removed completely with an excess of zinc dust; the filtrate from this stage would be purified electrolyte, while the precipitated sponge would be relatively high in zinc. This precipitate, obeying the countercurrent principle, would be charged back to the first stage where the high concentration of hydrogen sulfide group metals would attack and remove the residual zinc from the second-stage precipitate.

The metals of the hydrogen sulfide group below zinc in the electromotive force series of elements may also be removed separately by precipitation in a step wise manner. For example, where an alkali cyanide is used as an accessory salt in the alkaline solution for extracting precious metals during the leaching operation, these precious metals represented by gold and silver, can be precipitated from the solution by means of metallic copper to produce a soluble removable sludge of gold and silver. The residual solution may then be contacted with finely divided or sponge lead for precipitation of copper. After removal of the copper, the solution is then treated with electrolytic flake zinc to precipitate metallic lead and any remaining metals below zinc in the electromotive force series of elements under the conditions described above.

The purified zinc electrolyte or zincate solution 28 proceeds to the next step, precipitation of zinc by electrolysis 29.

Electrolysis may be conducted in cells of any convenient design, the main essential of a cell being a group of plane surfaced electrodes supported or suspended in a body of the electrolyte so that a direct electric current may pass between one or a group of these electrodes, called cathodes, to a pair or more of other electrodes, called anodes. Conveniently, a plurality of electrodes are usually placed in a box-like tank, alternating anodes with cathodes, which are spaced more or less evenly and parallel. Ordinarily, diaphragms between anodes and cathodes are not necessary. The electrolyte may be agitated or still; usually a continuous flow of electrolyte enters one end of the cell while depleted or partially depleted electrolyte overflows at the other end. Electrolyte may pass successively through a group of cells or each cell may have individual electrolyte inflow and outflow, as desired. Usually, several cells are in electrical series to conform with good engineering practice in electrical circuits, that is, to provide a good balance between voltage and amperage in the direct-current electric supply.

The tanks for cells may be constructed of any structural material which will withstand the alkaline electrolyte. Iron, steel and nickel are exceptionally good materials for this purpose, however, if the highest purity of zinc is desired a nonmetallic surface is best to prevent contamination of the zinc, and glass, rubber, or synthetic plastic linings of these metals is advantageous.

The cathodes may be practically of any metal which will not dissolve readily in the alkaline electrolyte, and they may be made of rolled sheet or cast metal. Iron, all varieties of steel and ferroalloys, nickel, zinc, magnesium, and magnesium alloys are the most desirable, although others, such as carbon, graphite, copper, bronze, brass, and the precious and rare metals are suitable.

The anodes are subject to strong oxidation during electrolysis, therefore, choice of anode material is limited to those elements which are very difficult to oxidize or whose oxides are insoluble in the alkaline electrolyte. These include iron, all varieties of steel and most ferro-alloys, nickel, carbon, graphite, and the noble or precious metals; iron, the various steel alloys, and nickel are the best and most practical of this group.

The voltage required per cell to deposit metal will vary principally with the temperature, the spacing between anodes and cathodes, and the current density. Using a typical zincate electrolyte, zinc will begin to deposit at a voltage of about 1.90 volts, and this voltage will rise as the current density is increased or as the spacing between electrodes is increased. Rising temperatures tend to reduce the voltage slightly. Practically a current density of 50 amperes per square foot of cathode surface will require about 2.5 volts at 30 degrees centigrade which will rise to about 5.0 volts at a current density of 200 amperes per square foot; both with a spacing of 1½ inches between anode and cathode.

Varying the current density will effect the type of zinc deposit produced. Below about 50 amperes per square foot, the zinc will deposit as a solid plate on the cathodes; an elevated temperature above about 70 degrees centigrade and rapidly agitated or circulated electrolyte assists in the deposition of solid plate. Above 50 amperes per square foot at the cathode, the zinc will tend to deposit as a flake powder, such as that mentioned in describing the purification, and this powder deposition is especially effective at cathode current densities varying from 80 to 150 amperes per square foot and higher. For producing plate zinc, it is best to maintain above about 20 grams zinc per liter in the electrolyte, but the electrolytic flake zinc can be obtained from electrolyte containing as low as 5 grams zinc per liter or lower. Obviously, both solid plate and dust can be produced by different cells in the same solution and electrolytic circuit, if desired.

Solid plated zinc may be removed from the cathode plates in the manner common to electro-winning processes for other metals. Electrolytic flake zinc dust can be removed mechanically by removing the plates from the cell periodically and scraping them, or by using highly polished sheet cathodes, the zinc will not adhere tenaciously and the zinc dust will fall off of its own accord. The zinc dust then can be removed as a slurry from the bottom of the cell and washed free of electrolyte.

The foregoing description of electrolysis is merely exemplary, rather than limitative, and other factors should be evident to those versed in the art of electrochemistry; and we may make such further variations, modifications, and omissions within the limits within which such can be controlled without departing from the spirit and scope of the present invention. The physical nature of the zinc recovered is immaterial to the spirit of this invention, except that it is desirable to produce at least sufficient electrolytic flake zinc for the purification of the electrolyte, as discussed under step 25, as we have discovered that the proper purification in accordance with our detailed description, produces an electrolyte so pure that any one skilled in electrolytic operations can produce pure zinc therefrom.

We have discovered that our dual system of purification—the lime treatment for removing silica and certain anions and the zinc-dust purification—results in an aqueous solution containing substantially nothing but caustic alkali and caustic zincate. Then, when the zinc is removed electrolytically the caustic alkali tied with the zinc as zincate is regenerated as caustic alkali. Thereby the caustic alkali is regenerated each cycle or as often as necessary and can be recycled in the process perpetually. The completion of the cycle is shown diagrammatically by the depleted zincate solution 30 being returned as alkaline solution 15 back to the leaching operation 11.

A typical operation in practice of the process described by the present invention is exemplified by the leaching of an oxidized zinc-lead ore, having the following analysis:

| | Per cent |
|---|---|
| Zn | 37.28 |
| Pb | 1.13 |
| Cu | 0.15 |
| $CO_2$ | 21.3 |
| Fe | 2.15 |
| $SiO_2$ | 2.94 |
| CaO+MgO | 18.4 |

The ore ground to pass a 60-mesh standard sieve was leached, as in step 11, in three stages, each with approximately nine times its weight of recycled alkaline solution 15, which contained about 195 grams $Na_2O$ per liter, present principally as sodium hydroxide but containing also an average of about 38 grams $CO_2$, 0.4 gram $SiO_2$, and between 4.6 to 10.5 grams Zn per liter. Leaching was performed at temperatures between 70 degrees and 80 degrees centigrade with agitation for about 6 hours in each stage. Between agitation stages, the pulp was settled or thickened for 12 to 16 hours and a clear solution decanted from a pulp containing about 20 percent undissolved solids. Leaching in the three stages was countercurrent, that is, the ore moved successively in one direction being leached in each stage with a solution leaner in zinc and the clear solution moved in the opposite direction; in this manner the solution became successively richer in zinc by passing to richer ore pulp in each stage.

The solids, after three stages of leaching, were filtered on a pressure filter and washed with water (step 21). An average dried residue from the ore weighed 36.6 percent as much as the original ore, due to dissolved minerals, and a typical dried residue 27 contained the following residual metals:

| | Per cent |
|---|---|
| Zn | 6.16 |
| Pb | 0.0004 |
| Cu | 0.064 |

The indicated extractions were: 94.0 percent of the zinc; 99.0 percent of the lead; and 84.7 percent of the copper.

The ore also contained 6.24 ounces of silver and less than 0.01 ounce of gold per ton. In part of the tests, sodium cyanide was included in the leach solution at the rate of 2 grams per liter or nearly 4 pounds per ton of solution. Residues from this cyanidation test as combined with the caustic leaching gave residues containing 1.05 ounces of silver and only a trace of gold. This indicated that 93.9 percent of the silver and most of the small amount of gold was extracted concurrently with the base metals.

The solution 21 combined with washings 24 proceeded to step 25, the precipitation of lead, copper, and other metal impurities with zinc dust 26. This purification was conducted in a tank equipped with a motor-driven propellortype agitator. The temperature was about 40 degrees centigrade, and zinc dust was added slowly in small portions at intervals of about 15 minutes until the rapid qualitative chemical test, described in detail above, showed that the solution no longer contained significant amounts of lead or copper. The zinc dust used was electrolytic flake zinc produced by this same process, and the stoichiometric amount of metallic zinc required by the leach solution was 0.49 gram per liter. The precipitation consumed from 0.65 to 0.70 gram of flake zinc which had a metallic zinc content of about 94 percent; therefore, the actual precipitation required from 0.61 to 0.66 gram of metallic zinc per liter, or an excess of 0.12 to 0.17 gram per liter.

Purification time ordinarily required from 1 to 2 hours, and then the metal precipitate 27 was separated from the purified zincate solution 28 by filtration.

Typical dried metal precipitate 27 analyzed as follows:

| | Per cent |
|---|---|
| Pb | 52.1 |
| Zn | 13.8 |
| Cu | 6.0 |

In the tests in which sodium cyanide had been added for recovery of the precious metals, similar precipitates were recovered which also contained 137.3 ounces of silver per ton and 0.04 ounce of gold. The ratio of concentration of the lead and copper is of the order of 46 into 1, and anyone versed in the art will recognize the vastly superior commercial qualities of this precipitate compared with the original ore.

The purified zincate solution 28, now ready for electrolysis analyzed as follows:

| | Grams per liter |
|---|---|
| Zn | 37.6 to 42.6 |
| Pb | 0.0006 |
| Cu | 0.0026 |
| Fe | 0.004 |

The high purity obtained and the extremely low ratio of other metals to zinc will be apparent to one skilled in the art.

Electrolysis 29 was conducted in a rectangular cell with a hopper bottom, constructed of mild sheet steel and painted on the interior with plastic paint. All types of cathode material mentioned in the general specification above were found to be suitable; magnesium alloy was especially satisfactory for producing flake dust, and stainless steel appeared to be slightly more favorable in producing solid plate metal. Anodes of all types mentioned in the general specification were used satisfactorily; as nickel and mild steel are the most resistant metals to caustic solution, they would be best in commercial practice and the minute amounts of their corrosion products would be least harmful to the zinc. Stainless steel worked well, especially after conditioning for several hours in electrolyte as an anode. The cell for the tests in the example contained two cathodes and three anodes.

Solid plates were produced at current densities between 25 and 50 amperes per square foot and an electrolyte temperature of 80 degrees centigrade. Electrolytic flake zinc was produced at around 40 degrees centigrade and at 50 amperes per square foot and as high as 200 amperes per square foot; especially good results were obtained at current densities between 80 and 120 amperes per square foot. At 80 amperes per square foot, current efficiency was above 80 percent and power consumption was about 1.2 kw.-hr. of direct-current energy per pound of flake zinc deposited. Power consumption increased slightly as the current density was raised.

Flake zinc produced analyzed better than 99.0 percent Zn and better than 94.0 percent metallic Zn; the difference, calculated according to standard methods (difference times 1.2447=ZnO), meant that less than 6 percent ZnO was generally present. Other metallic impurities analyzed as follows, typically:

| | Per cent |
|---|---|
| Pb | 0.002 |
| Cu | 0.005 |
| Fe | 0.020 |

Purified electrolyte was fed to the cell at such a rate that the overflow of the cell, or depleted electrolyte 30 contained from 4.6 to 10.5 grams Zn per liter, thus recovering from 70 to 90 percent of the zinc from the purified electrolyte. The balance, of course, was not lost, as it recycled in the leaching of additional ore.

The solution was recycled eight times without regeneration or conditioning, step 16. The electrolyte during this time gradually built up to 2.8 grams $SiO_2$ and 53 grams $CO_2$ per liter. At this point conditioning with lime was injected into the next cycle, and the solution was lowered to 1.9 grams $SiO_2$ and 22 grams $CO_2$ per liter.

The principal advantages of the process described by the present invention are: (1) It provides a process for treating certain low-grade, complex, or refractory ores, which cannot be treated by other known methods economically; (2) it provides a process for treating efficiently and economically certain other ores, which are now being treated by known methods in an inefficient and expensive manner; (3) it provides a process for recovering additional metal values from waste productes or tailings resulting from processes in which the oxidized metals or portions of the metallic values are in an oxidized form; for instance, oxidized copper and zinc minerals are not readily amenable to recovery by flotation processes and the unrecovered portion of these minerals could be recovered by the present invention; (4) it provides a process for treating certain ores for the recovery of metals amenable to this process and leaves the residue comparatively unaltered, but generally beneficiated to some extent, so that this residue can be used for recovery of other metals; for instance, in a highly ferruginous oxidized lead-zinc ore, the lead and zinc could be extracted, leaving a residue which might be suitable for use as an iron ore; and (5) it provides a means of treating certain calcareous or alkaline ores which are costly or impossible to treat by present well-known acid leaching methods because of the high consumption of acid required for their dissolution.

Since many widely differing embodiments of the invention will occur to one skilled in the art, the invention is not limited to the specific details illustrated and described, and various changes may be made therein without departing from the spirit and scope thereof.

What is claimed is:

1. The method for the separation and recovery of metallic constituents of oxidized lead-zinc ores which contain other metals including gold, silver, and copper, in addition to lead and zinc which comprises the steps of leaching the oxidized ore in an alkali-cyanide solution; treating the pregnant leach solution with lime; removing the insoluble residues from the thus treated solution;

displacing the gold and silver in the solution with metallic copper; separating the precipitated gold metal and silver metal; displacing the copper from the solution with metallic lead; separating the precipitated copper metal; adjusting the temperature of the solution to about 35° to about 50° C., displacing lead and any remaining metals below zinc in the electromotive force series of elements by contacting the solution with electrolytic flake zinc, immediately removing the metal precipitate from solution; electrowinning metallic zinc from the alkaline solution from which the more noble metals have been separated; and recycling the barren alkaline solution to the leach step.

2. The method for the separation and recovery of metallic constituents of mixed-oxide-lead-zinc ores which contain other metals including gold, silver, and copper, in addition to lead and zinc which comprises the steps of leaching the mixed-oxide ore in an alkali-cyanide solution; treating the pregnant leach solution with lime; removing the insoluble residues from the thus treated solution; displacing the gold and silver in the solution with metallic copper; separating the precipitated gold metal and silver metal; displacing the copper from the solution with metallic lead; separating the precipitated copper metal; adjusting the temperature of the solution to about 35° C. to about 50° C., displacing lead and any remaining metals below zinc in the electromotive force series of elements by contacting the solution with electrolytic flake zinc added in small increments until slightly more than that amount of zinc theoretically required to displace said metals has been added, immediately removing the metal precipitate from the solution; electrowinning metallic zinc from the alkaline solution from which the more noble metals have been separated; and recycling the barren alkaline solution to the leach step.

3. The method for the recovery of zinc from oxidized zinc ores containing other metals including lead and zinc which comprises leaching the oxidized ore with a strong alkaline solution, displacing the metals other than zinc from the alkaline solution at a temperature of about 35° C. to about 50° C. by contacting the solution with electrolytic flake zinc added in small increments until slightly more than that amount of zinc required theoretically to displace all of the other metals from the solution has been added, immediately removing the metal precipitate from the solution, electrowinning metallic zinc in substantially pure form from the remaining purified zincate solution, and recycling the regenerated barren solution to the leaching step.

4. The method for the separation and recovery of metals from oxidized lead-zinc ores containing other metals including gold, silver and copper which comprises leaching the oxidized ore with a strong alkaline solution to which a small quantity of alkali cyanide has been added to concurrently extract the gold and silver, treating the hot pregnant solution with lime, removing the insoluble residues from the thus treated solution, displacing the metals other than zinc from the solution at a temperature of about 35° C. to about 50° C. by contacting the solution with electrolytic flake zinc, immediately removing the metal precipitate from the solution, electrowinning metallic zinc in substantially pure form from the remaining purified zincate solution and recycling the regenerated barren solution to the leaching step.

5. The method for the separation and recovery of metals from oxidized lead-zinc ores containing other metals which comprises leaching the oxidized ore with a strong alkaline solution containing from about 5% to about 25% of caustic alkali, treating the hot pregnant solution with lime, removing the insoluble residues from the thus treated solution, displacing metals other than zinc from the solution at a temperature of about 35° C. to about 50° C. by contacting the solution with electrolytic flake zinc, immediately removing the metal precipitate from the solution, electrowinning metallic zinc in substantially pure form from the remaining purified zincate solution, and recycling the regenerated barren solution of strong alkali to the leaching step.

6. The method for the separation and recovery of metals from oxidized lead-zinc ores containing other metals which comprises leaching the oxidized ore at a temperature of about 50° C. to about 80° C. with a strong alkaline solution containing from about 5% to about 25% of caustic alkali, adjusting the temperature of the solution to from about 35° C. to about 50° C., displacing metals other than zinc from the solution by contacting the solution with electrolytic flake zinc added in small increments until slightly more than that amount of zinc required theoretically to displace all of the other metals from solution has been added, immediately removing the metal precipitate from the solution, electrowinning metallic zinc in substantially pure form from the remaining purified zincate solution, and recycling the regenerated barren solution of strong alkali to the leaching step.

7. The method for the separation and recovery of metals from oxidized lead-zinc ores containing other metals which comprises leaching the oxidized ore at a temperature of about 50° C. to about 80° C. with a strong alkaline solution containing from about 5% to about 25% of caustic alkali, treating the hot pregnant solution with lime, removing the insoluble residues from the thus treated solution, adjusting the temperature of the solution from about 35° C. to about 50° C., displacing metals other than zinc from the solution by contacting the solution with electrolytic flake zinc added in small increments until slightly more than that amount of zinc required theoretically to displace all of the other metals from solution has been added, immediately removing the metal precipitate from the solution, electrowinning metallic zinc in substantially pure form from the remaining purified zincate solution, and recycling the regenerated barren solution of strong alkali to the leaching step.

8. The method for the separation and recovery of metals from oxidized lead-zinc ores containing other metals including gold, silver, and copper which comprises leaching the oxidized ore at a temperature of about 50° C. to about 80° C. with a strong alkaline solution containing from about 5% to about 25% of caustic alkali and to which a small quantity of alkali cyanide has been added to concurrently extract the gold and silver, treating the hot pregnant solution with lime, removing the insoluble residues from the thus treated solution, adjusting the temperature of the solution to about 35° C. to 50° C., displacing the metals other than zinc from the solution by contacting the solution with electrolytic flake zinc added in small increments until slightly more than that amount of zinc required theoretically to displace all of the other metals from the solution has been added, immediately removing the metal precipitate from the solution, electrowinning metallic zinc in substantially pure form from the remaining purified zincate solution, and recycling the regenerated barren solution of strong alkali to the leaching step.

ROBERT V. HILLIARD.
CHARLES T. BAROCH.

References Cited in the file of this patent

UNITED STATES PATENTS

| Number | Name | Date |
|---|---|---|
| 592,055 | Ketchum | Oct. 19, 1897 |
| 780,293 | Joseph | Jan. 17, 1905 |
| 1,115,521 | Ellis | Nov. 3, 1914 |
| 1,578,618 | Welch | Mar. 30, 1926 |
| 1,759,494 | Tainton | May 20, 1930 |
| 2,187,750 | Marvin | Jan. 23, 1940 |
| 2,286,240 | Stack | June 16, 1942 |
| 2,340,188 | Jukkola | Jan. 25, 1944 |

FOREIGN PATENTS

| Number | Country | Date |
|---|---|---|
| 415,639 | France | July 19, 1910 |
| 24,121 of 1897 | Great Britain | Nov. 20, 1897 |